May 9, 1944.  F. A. HOLBY  2,348,255
TANK DISCHARGE CONTROL MEANS
Filed Feb. 27, 1940  6 Sheets-Sheet 1
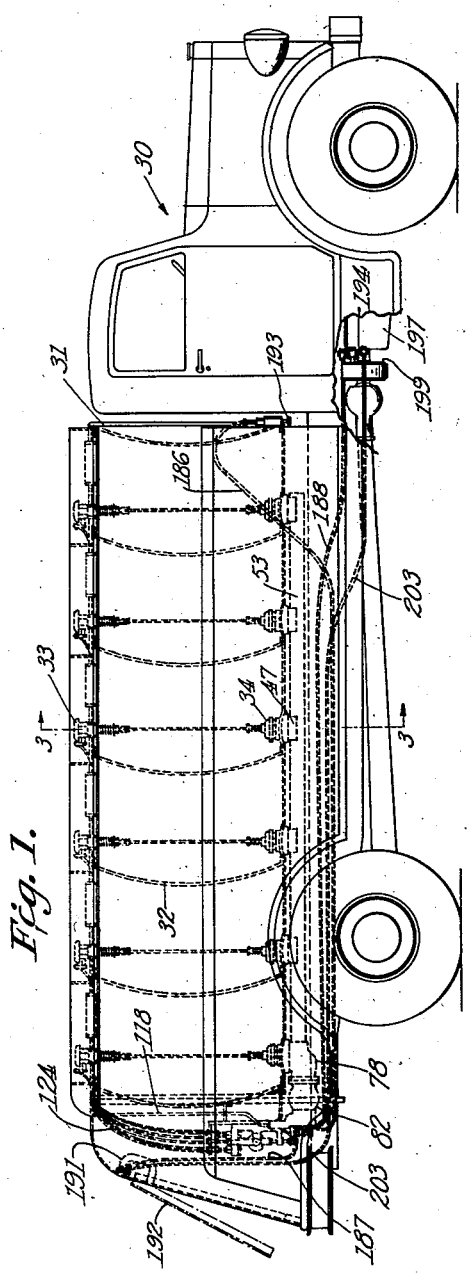
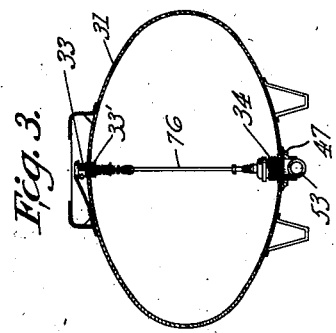
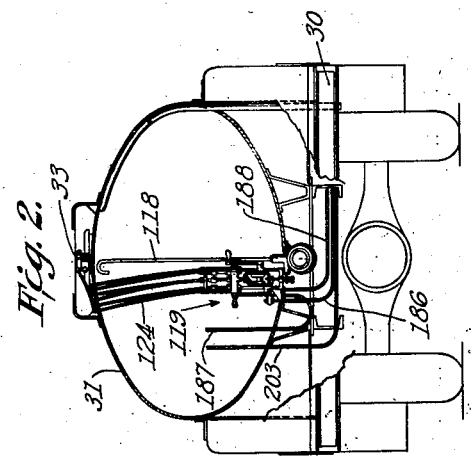
Inventor
Frank A. Holby
By Cushman, Darby & Cushman
Attorney May 9, 1944.　　　F. A. HOLBY　　　2,348,255
TANK DISCHARGE CONTROL MEANS
Filed Feb. 27, 1941　　　6 Sheets-Sheet 2

Inventor
Frank A. Holby
By Cushman, Darby & Cushman
Attorneys

May 9, 1944.  F. A. HOLBY  2,348,255
TANK DISCHARGE CONTROL MEANS
Filed Feb. 27, 1940   6 Sheets-Sheet 3
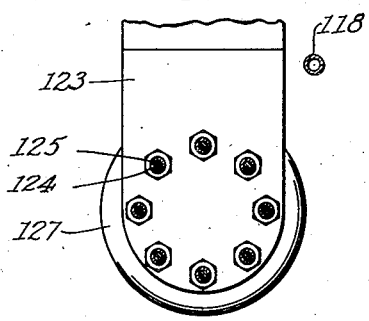
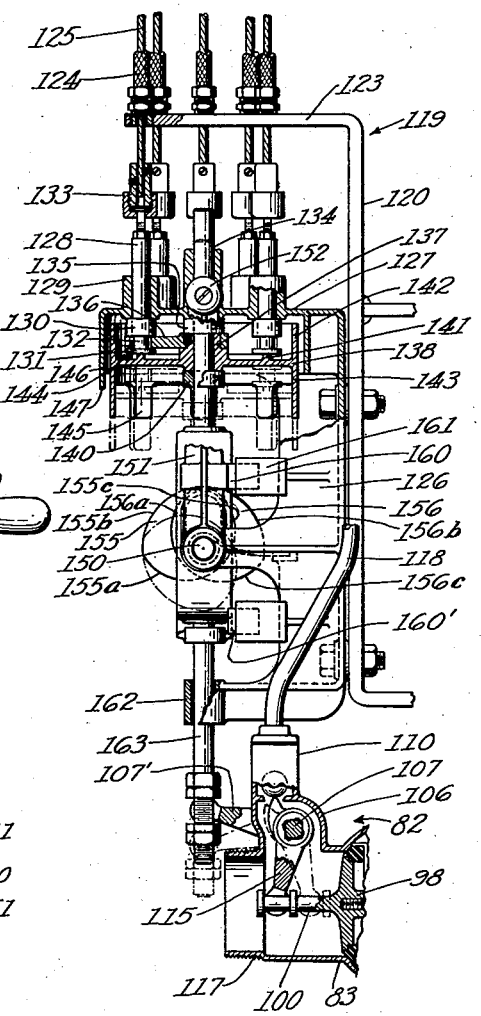
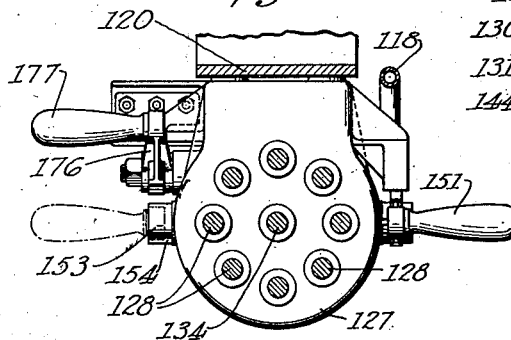
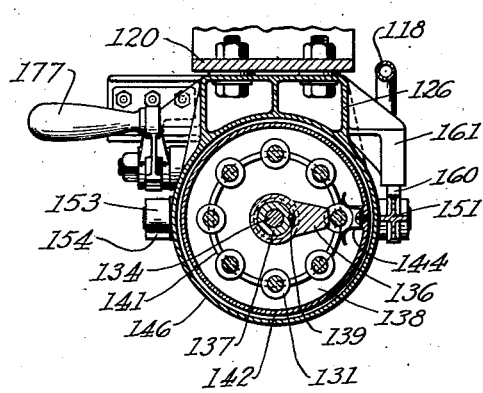
Inventor
Frank A. Holby
By Cushman, Darby & Cushman
Attorneys

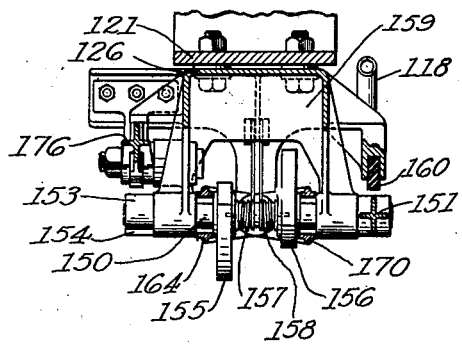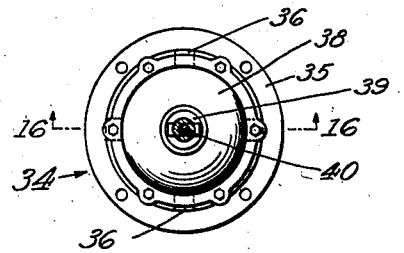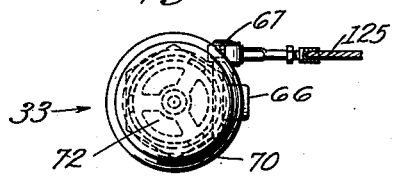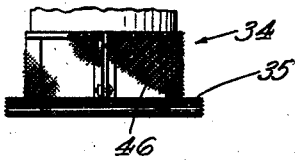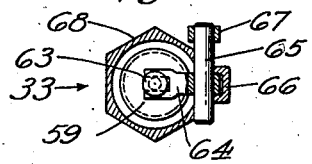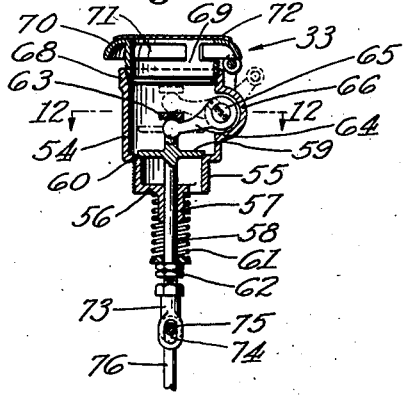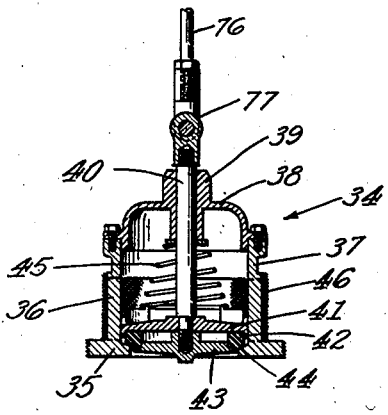

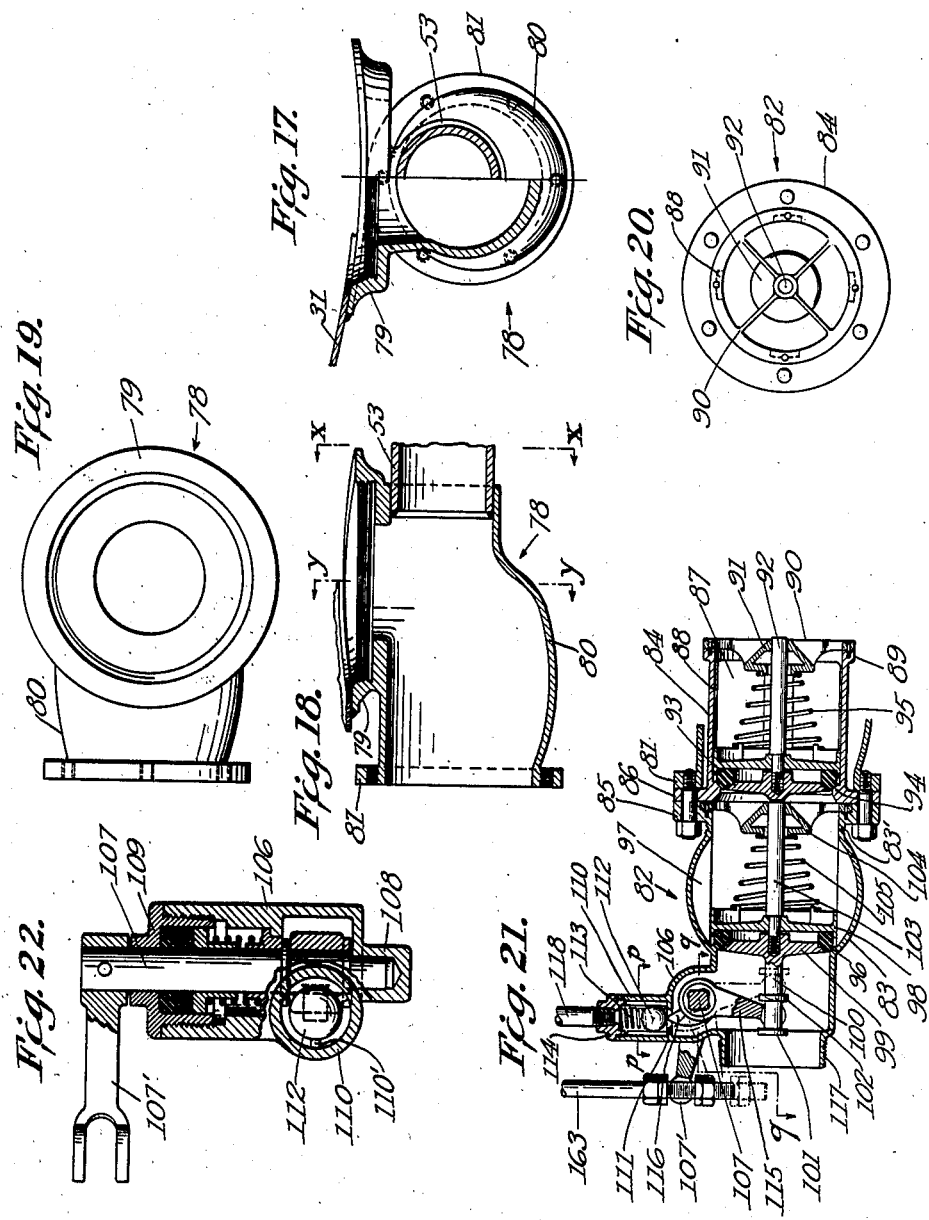

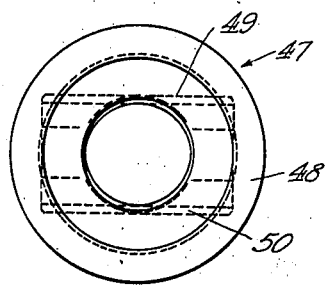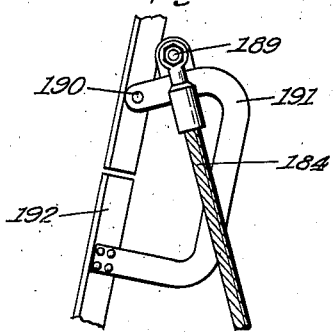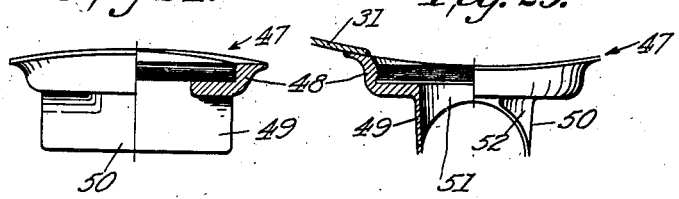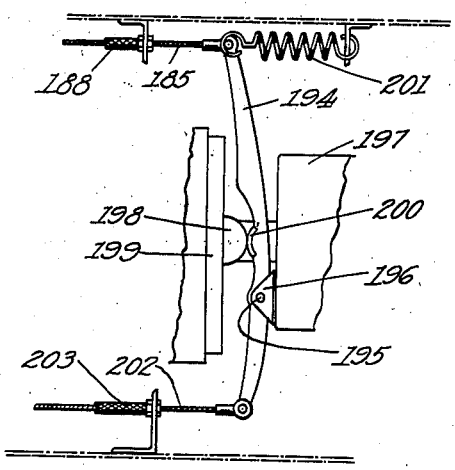

Patented May 9, 1944

2,348,255

UNITED STATES PATENT OFFICE 2,348,255

TANK DISCHARGE CONTROL MEANS

Frank A. Holby, Riverside, Conn., assignor to The William F. Kenny Company, New York, N. Y., a corporation of New York Application February 27, 1940, Serial No. 321,147

19 Claims. (Cl. 222—54)

This invention relates to discharge control means for tanks and particularly to control means for multiple compartment gravity discharge tanks of tank trucks. A main object of the invention is to provide simple and easily operated valve actuating means, together with conveniently arranged selecting means for the compartment valves. Another object is to provide effective safety devices whereby discharge will be immediately interrupted under emergency conditions such as fire or movement of the truck during unloading. Typical means whereby these and other objects are attained are shown by way of example in the accompanying drawings with reference to which description of the invention will be made.

In the drawings:

Figure 1 is a side elevation of a tank truck equipped in accordance with the present invention;

Figure 2 is a rear end elevation of the truck with the bucket box, which appears in Figure 1, removed;

Figure 3 is a section on line 3—3 of Figure 1;

Figure 6 is an elevation, partly in section, of the apparatus of Figures 4 and 5 as seen from the right of the latter figure;

Figure 7 is a section on line 7—7 of Figure 5;

Figure 8 is a section on line 8—8 of Figure 5;

Figure 9 is a section on line 9—9 of Figure 5;

Figure 10 is a section on line 10—10 of Figure 5;

Figure 11 is a plan view of a compartment vent valve;

Figure 12 is a section on line 12—12 of Figure 13;

Figure 13 is an axial section of the valve of Figure 11;

Figure 14 is a plan view of a compartment discharge or emergency valve;

Figure 15 is an elevation of the lower portion of the valve of Figure 14;

Figure 16 is an axial section of the valve of Figure 14;

Figure 17 is a sectional view of a terminal manifold fitting on lines $x$—$x$ and $y$—$y$ of Figure 18;

Figure 18 is an axial section of the fitting;

Figure 19 is a plan view of the fitting;

Figure 20 is an end elevation of an unloading valve;

Figure 21 is an axial section of the unloading valve and a partial axial section of the fitting of Figures 17 to 19;

Figure 22 is a sectional view on lines $p$—$p$ and $q$—$q$ of Figure 21;

Figure 23 is a plan view of a tank compartment outlet fitting;

Figure 24 is a side elevation partly in axial section of the fitting of Figure 23;

Figure 25 is a rear elevation partly in section of the fitting of Figure 23;

Figure 26 is an elevation of knock-off mechanism operated by movement of the truck during unloading, and Figure 27 is an elevation of a bucket compartment door hinge.

Figure 4:
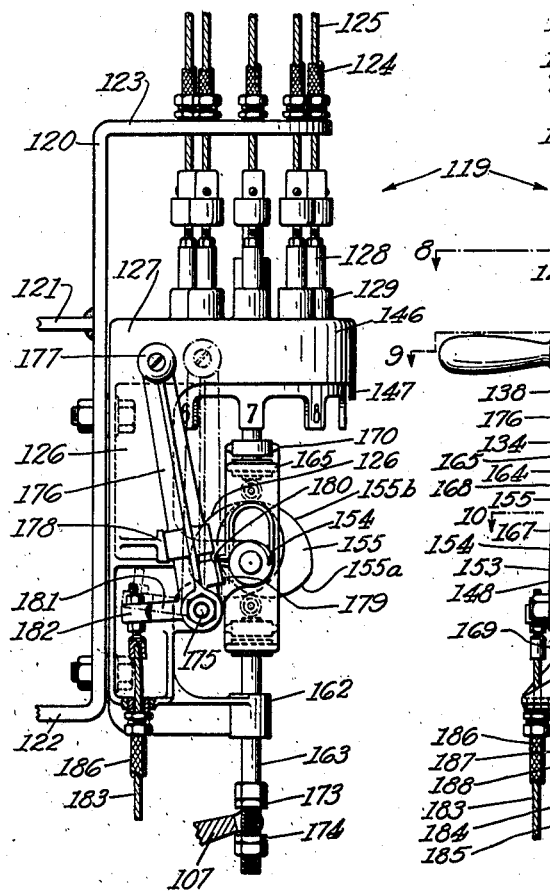
Figure 4 is a side elevation on an enlarged scale of a valve selecting and operating unit, as seen from the left, Figure 2.

Referring to the drawings, Figures 1 to 3, reference numeral 30 designates generally a truck chassis on which is mounted a tank 31 which, as here shown, is divided into six separate compartments by partitions 32. In each compartment the tank shell has vertically aligned top and bottom openings in which are respectively disposed a vent valve 33 and a discharge or emergency valve 34.

The valve 34, Figures 14 to 16, comprises a base flange 35 which is externally threaded and from which rise four equally spaced uprights 36 whose upper ends merge with an annular portion 37 on the upper edge of which is secured a cap 38 having a central boss box 39 provided with an axial bore in which is slidably guided a stem 40. Stem 40 has a reduced lower end providing a shoulder against which abuts an imperforate circular disc 41 which is centrally apertured to receive the reduced end. The edge of the disc is guided by the upright portions 36 and is downwardly flanged to receive an annular gasket 42 of rubber or the like which is held in place by a disc 43 threaded on the extremity of the reduced portion of the stem. Gasket 42 has a lower annular beveled face which is normally engaged with an annular seat 44 provided on an inward extension of flange 35. Normal seating of the gasket is assured by a compression spring 45. A strip of wire mesh 46 is secured around the uprights 36 and serves to strain fluid entering the gates between uprights 36.

The bottom openings of all of the compartments except the rearmost have fittings 47 welded to their lower margins. As particularly shown in Figures 23 to 25, the fitting 47 has a top rim 48 fitted to the tank curvature and provided with internal threads with which flange 35 of a valve 34, Figure 3, is engaged. Downwardly the rim merges into two longitudinally extending webs 49 and 50 whose ends are connected by walls 51 and 52 the lower edges of which are curved to fit over a manifold conduit 53 which extends beneath all the compartments, the conduit having top openings within the fittings and being closed at its front end.

The vent valve 33, Figures 11 to 13, comprises a generally cylindrical main body portion 54 having a somewhat reduced externally threaded bottom portion 55, whose lower inner margins are connected by a spider 56 having a central downwardly extending boss 57 provided with an axial bore. Slidable in the bore is a stem 58 which is integral with a valve disc 59 normally engaged with a seat 60 at the top of portion 55. Seating of the disc is assured by a compression spring 61 disposed between the spider and abutment nuts 62 threaded on the lower portion of the stem. The stem is continued upwardly beyond disc 59 and has secured to its extremity an abutment disc 63 under which is engaged the forked end of a lever 64 which is fixed on a rock shaft 65 journalled on a horizontal axis in an outwardly expanded portion 66 of body portion 54. On an externally projecting end of shaft 65 is fixed an upwardly extending lever 67.

The upper part 68 of body portion 54 is externally hexagonal. Inwardly it is threaded and is engaged by a short tubular member 69 which has an external downwardly curved peripheral flange 70 serving as a guard for openings as at 71 which are located above part 68. The top of member 69 is closed by a disc 72 which is secured in place by a low melting solder.

Portion 55 of valve 33 is threaded in a fitting 33' set in the top opening of the compartment, Figure 2.

Threaded on the lower end of stem 58 is a clevis 73 which has axially elongated slots as at 74 in which is engaged a bolt 75 which is passed through the upper end of a rod 76. The lower end of rod 76 is connected to stem 40 of valve 34 by means of a hinged coupling 77. The pin and slot connection between stem 58 and rod 76 provides a lost motion, which, together with the hinged joints, assures that the vent and discharge valves may fully close without interfering with each other. As a result of this connection, when lever 64 is swung upwardly the vent valve will open and thereafter the discharge valve will open.

At its rear end the manifold 53 is connected into and welded to a terminal fitting 78 which has a rim 79 welded to the lower margin of the bottom opening of the rearmost compartment. Below the rim 79 is a hollow formation 80, which at its forward end has a restricted circular opening for the reception of the manifold end, and rearwardly is considerably expanded to provide a large opening surrounded by an annular flange 81.

Reference numeral 82 designates generally an unloading valve which comprises aligned portions 83 and 84 having abutting flanges 85 and 86 through which they are bolted to flange 81 with portion 84 extending within and spaced from the walls of portion 80 of fitting 78. Portion 84 has side openings as at 87 defined between four axially extending strips as at 88, which terminate away from flange 86 in a rim 89 to which is secured a spider 90 having a central portion 91 provided with an axial bore in which is guided the stem 92 of a valve body 93. The latter may be the same as the valve body described with particular reference to Figure 16 and comprising the elements 41, 42 and 43. A seat 94 for the valve body 93 is provided inwardly of flange 86 and the valve body is normally seated by a compression spring 95.

Portion 83 is of spherical form adjacent flange 85 and defines a seat 96 opposed to the latter. Four internal ribs, as at 97, have rectilinear edges for guiding a valve body 98 which may be of the same construction as the valve body 93 except that the disc 99 has an integral extension 100 provided with spaced apart annular flanges 101 and 102.

The stem 103 of valve body 99 is guided in a spider 104 against which bears a valve seating spring 105. When valve bodies 93 and 99 are seated, as shown, the right hand end of stem 103 is slightly spaced away from the outer disc of valve body 93.

Journalled in an upward enlargement 106 of portion 83 is a horizontal rock shaft 107 which extends transversely of the valve axis. One end of this shaft is received in a blind bore in a boss 108, while the other end passes outwardly through a gland nut 109 and has fixed thereto a lever 107', which has a forked end. At the base of an upwardly extending neck 110 formed on enlargement 106 is an internal annular flange 111 which defines a seat for a ball 112 which is normally seated by a compression spring 113 whose upper end bears against a nipple 114 threaded in the upper end of the neck. The ball is guided for movement forward and away from the seat by axially extending ribs 110' on the inside of the neck. A lever 115 mounted on the squared portion of shaft 107 has a forked extremity engaged between flanges 101 and 102 of the extension 100 of disc 99. The lever has also formed thereon a lug 116 which, in the full line position shown, projects upwardly to unseat ball 112. When lever 115 is swung to the right, Figure 21, to the dotted line position indicated, ball 112 will be seated by spring 113, and valve bodies 99 and 93 will be successively unseated in the order named.

At its rear extremity portion 83 has a threaded neck 117 for the attachment of a hose. Threaded in nipple 114 is a tube 118 which extends freely upwardly in the bucket compartment. The tube extends to a sufficient height to prevent overflow at maximum head in the tank. With valve body 112 unseated the hose is enabled to drain readily.

Reference numeral 119 designates generally the control means for the compartment valves and the unloading valve. Referring to Figures 1, 2 and 4 to 10, reference numeral 120 designates a bracket having an upright portion secured to the rear edge of a plate 121 and a bottom forwardly bent portion 122 secured to the rear tank wall to which plate 121 is also secured. The bracket has a top horizontal portion 123 provided with vertical bores equi-distantly spaced apart on a common circle and in which are threaded coupling members to which are connected tubes or conduits 124 which guide cables 125 running to the lever arms 67 of the vent valves.

Secured to bracket 121 below portion 123 is a bracket 126 which supports all of the operating mechanisms for the various valves. Bracket 126 includes a horizontal portion 127 provided with vertical bores aligned with the bores of flange portion 123 and in which are slidable plungers 128. The plunger bores extend through upwardly projecting bosses 129 in order to provide adequate guide surfaces for the plungers. Below portion 127 the plungers have an integral annular enlargement 130 which limits their upward movement. Spaced below this enlargement is a terminal annular enlargement or head 131 so that an annular recess 132 is provided, the recesses of all of the plungers lying between common horizontal bounding planes when the plungers are in the upper limit position particularly shown in Figure 6. Each plunger is in connection with a cable 125 by means of an adjustable coupling 133. These couplings are adjusted so that when the plungers are in their upper limit position and the vent valves are closed, there is little or no slack in the cables 125.

Bracket portion 127 is provided with a vertical bore at the center of the circle on which the plungers 128 are arranged, and in this bore is slidable a rod 134. Beneath portion 127, rod 134 has affixed thereon a stop collar 135. Beneath the stop collar is a radial finger 136 which has a bore in which is received an upwardly extending sleeve 137 formed on the hub of a hand wheel 138, the finger being secured to the sleeve against rotation by a screw or key 139. Beneath the hub of the hand wheel a stop collar 140 is fixed on rod 134 so that the hand wheel and finger are held against relative axial movement to the rod 134 although freely rotatable in unison thereon. The length and disposition of finger 136 are such that as the hand wheel 138 is rotated, the plungers being in upper limit position, the free end of finger 136 will swing through adjacent portions of the plunger recesses 132, the thickness of the finger being slightly less than the width of the recesses.

Figure 5:
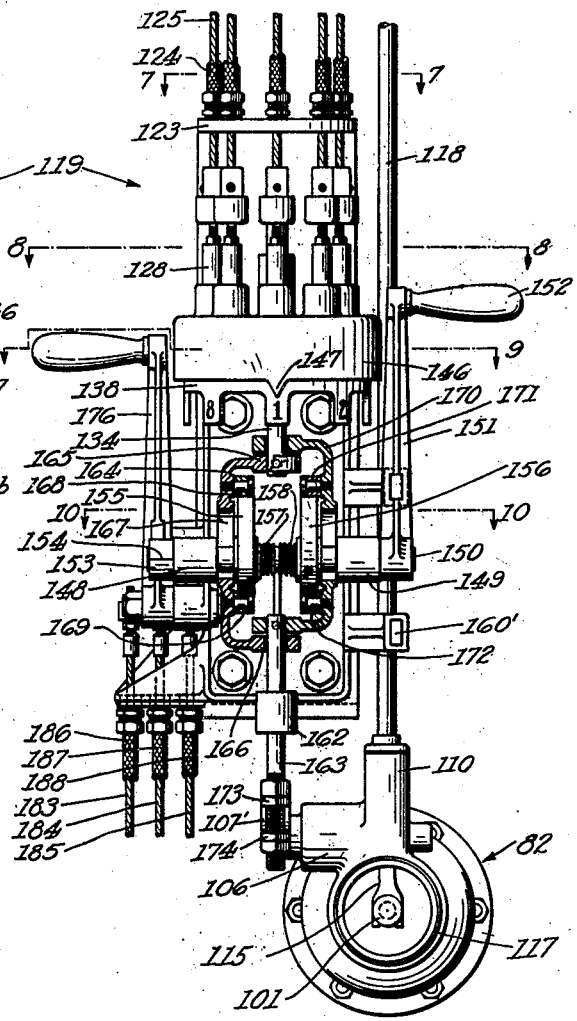
Figure 5 is an elevation of the apparatus of Figure 4 as seen from the right of that figure.

To assure that the plungers will be in their upper limit positions, even in case of some slack in cables 125, the web of wheel 138 has formed on its upper surface an annular rib 141 which, when the wheel is in the position shown in Figure 6, will abut the bottoms of the heads 131 so as to properly position the recesses 132 relative to finger 136. Wheel 138 is also provided with a cylindrical rim having an upwardly projecting portion 142 and a downwardly projecting portion 143. Within portion 142 is fixed a U-shaped spring 144 which cooperates with the plunger heads 131 to yieldingly position the finger 136 in the recess 132 of a selected plunger, as particularly shown in Figure 9. This spring also appears in part at the left of Figure 6. Rim portion 143 is provided with depending fingers 145 spaced apart on radial lines passing through the plunger axes. One of these fingers is on the radial line of finger 136 and, as indicated in Figure 5, the fingers are numbered from 1 to 8. Portion 127 has a circular depending skirt 146 surrounding the upper portion of the rim of wheel 138 when the latter is in its full line position of Figure 6, and formed on the lower edge of skirt 146 is a pointer or marker 147. The arrangement is such that when finger 136 is engaged in the recess 132 of any plunger, the marker 147 will indicate the number of the tank compartment with whose valves the selected plunger is associated. Fingers 145 may be conveniently grasped for turning wheel 138.

It will be evident that with finger 136 engaged in a plunger recess 132 as shown in Figure 9, downward movement of rod 134 will cause the plunger to be pulled downwardly, thereby operating the vent valve lever to which the plunger is connected. Consequently, the vent valve will be opened, and, thereafter, as heretofore described, the associated discharge valve will be opened. Return of the plungers upwardly permits the operated valves to close under the action of their associated springs. Finger 136 is vertically reciprocable through a distance indicated by the full and dotted line positions of fingers 145 shown in Figure 6, the reciprocation being accomplished by means which will be described.

At this point it should be mentioned that the described selecting mechanism is preferably made with eight selecting positions as a standard. When there are a fewer number of compartments, some of the plungers, or at least their associated cables, may be omitted. The tank shown by way of example in Figure 1 has six compartments, and consequently two of the plungers 128 of the described selector may be omitted or left unconnected.

Journalled in bearings 148 and 149 at the ends of horizontally projecting arms of bracket 126 is a rock shaft 150. On one end of shaft 150 is fixed a lever or crank arm 151 provided at its free end with a handle 152. At its other end shaft 150 has affixed thereon a collar 153 provided with a slightly under-cut notch presenting a shoulder 154 extending axially of the collar.

Secured to shaft 150 between bearings 148 and 149 is a pair of cams 155 and 156, these being spaced somewhat inwardly from the bearings. Two torsion springs 157 and 158 are anchored at one end to the respective cams and have their other ends extended and engaged under a horizontal web 159 of bracket 126. These springs yieldingly hold shaft 150 and therewith collar 153, cams 155 and 156 and lever 151 in the full line position shown in the drawings wherein a portion of lever 151 engages a rubber stop 160 set in a socket formed in a portion 161 of bracket 126.

Slidable in a vertical bearing 162 at the base of bracket 126 is a rod 163 coaxial with rod 134. A yoke 164 has an arm 165 secured to the lower extremity of rod 134 and an arm 166 slidably guided on rod 163. The yoke has a slotted portion 167 through which shaft 150 passes, this slotted portion being guided between bearing 148 and an adjacent hub of cam 155 against twisting about a vertical axis. Yoke 164 carries top and bottom rolls 168 and 169 as followers for cam 155, the axes of these rollers lying in a vertical plane which includes the axis of shaft 150.

Reference numeral 170 designates a yoke identical with yoke 164 but having its upper arm slidably guided on rod 134 above arm 165 and its lower arm secured to rod 163 above arm 166. The yoke 170 carries top and bottom rollers 171 and 172 as followers for cam 156.

Rod 163 has threaded on its lower end abutment nuts 173 and 174. The forked end of lever 107', which controls the unloading valve and associated vent valve 112, is engaged between these abutments nuts, straddling the shaft portion therebetween as most clearly shown in Figure 5.

Mounted on a laterally projecting stud 175 somewhat behind and below collar 153 is a lever or crank arm 176 provided with a handle 177, this lever normally occupying the position particularly shown in Figure 4 wherein it bears against a stop 178 on bracket 126. On an opposite flat surface of lever 176 is secured by a low melting solder a small rectangular plate 179 which has a somewhat under-cut edge 180 adapted to be engaged by shoulder 154 of collar 153.

After the operator has adjusted wheel 138 for the selection of the tank compartment which he desires to unload, he grasps handle 152 and pulls lever 151 toward him, thus rotating shaft 150 (Figure 6), and therewith the cams and collar 153 in a counterclockwise direction. Roller 169 of yoke 164 is on a rise 155a of cam 155 and, consequently, the yoke is forced downwardly thereby lowering rod 134 with the result heretofore explained. The rise of cam 155 has an angle of about 90° and, consequently, the cam must be rotated through this distance to move yoke 164 to its lower limit. Rise 155a is followed by a 90° dwell 155b so that continued rotation of shaft 150 through a further angle of 90° will cause yoke 164 to be retained in its lower limit position with the selected vent and compartment discharge valves held open.

During the first 90° movement of shaft 150, wherein cam 155 comes to the dotted line position of Figure 6, a dwell 156b of cam 156 has been moving under the top roller 171 of yoke 170 and the latter has remained stationary. As the dwell now passes from beneath roller 171, a rise 156a of cam 156 engages the lower roller 172 of yoke 170 and the latter is forced downwardly during the next 90° angle of movement of the cam, carrying rod 163 with it so that lever 107, is swung downwardly to open the unloading valve 82 and close the vent valve associated therewith. When lever 151 reaches a stop 160', shoulder 154 of collar 153, Figure 4, has revolved 180° in a clockwise direction. The operator now grasps handle 177 and pulls lever 176 toward him so that the edge 180, acting as a latch, is engaged under shoulder 154 so that the cams are held in their operated position. When unloading has been completed, lever 176 is pushed back thereby releasing the latch, and shaft 150 is returned to its original position by springs 157 and 158 wherein lever 151 again abuts stop 160. During the first 90° of this return a rise 156c of cam 156 acts on follower 171 to return yoke 170 to the position shown in the drawings, thus positively seating valve body 99 of the unloading valve even should its spring 105 be broken. During the succeeding 90° of the return, a rise 155c of cam 155 engages follower 168 of yoke 164 so that the latter is moved upwardly, carrying wheel 138 and associated parts from the dotted to the full line position of Figure 6.

Lever 176 constitutes one arm of a bell crank lever having a second arm 181 formed as a T and whose head is designated by the reference character 182 (Figure 4). The head is provided with three longitudinally spaced openings in which are secured terminal fittings of three cables 183, 184, and 185, respectively, these cables being slidable in suitably mounted conduits 186, 187 and 188 (Figures 1, 2, 4 and 5). Cable 184 runs to a point of connection 189 normally above the pivot 190 of a hinge 191 whose lower end is secured to the door 192 of the bucket compartment (Figure 27). Cable 183 extends up to a pull handle 193 slidably mounted at the front end of the tank. Cable 185 runs to one end of a lever 194 (Figure 26) pivoted intermediate its ends on a pin 195 in a bracket 196 secured to the rear portion 197 of the gear housing. A striker or cam 198 is eccentrically fixed on the front face of the drive shaft brake 199 of the truck in a position to engage a portion 200 of lever 194 when the lever 194 is swung to bring its said portion into the range of striker 198. A tension spring 201 is engaged with the upper end of lever 194 and tends to swing the latter in a clockwise direction. A cable 202 is attached to the opposite end of lever 194 from cable 195 and is guided through a conduit 203 to the point of connection 189 of the door hinge 191.

When door 192 is in the closed position of Figure 27, the cables 184 and 202 are taut and lever 176 could not be swung even if it were accessible. However, when the door is in its open position, cables 184 and 202 are slackened but they are again tautened when lever 176 is swung to engage the latch means for shaft 150. In the case of cable 202, this occurs by reasons of the fact that cable 185 has swung lever 194 to bring its portion 200 into the range of the striker 198.

The compartment door 192 is held in open position conventionally by means including a fusible portion so that in case of fire the door will close. In the present case when this happens, cable 184 will exert a downward pull on arm 181 so that arm 176 will be pulled to the left (Figure 4) to release the edge 180 of latch plate 179 from shoulder 154 so that shaft 150 will be returned by springs 157 and 158 and the compartment valve and the unloading valve will immediately close. Also, fire in the vicinity of latch plate 179 will fuse the solder by which the plate is secured to lever 176 so that the plate will fall away and permit the return of shaft 150. It will be understood that the normal engagement of parts 180 and 154 is sufficiently delicate so that relatively slight unlatching force suffices to effect release, although the engagement is adequate under normal circumstances.

Again assuming shaft 150 to be latched in unloading position, if the truck should start to move, the drum 199 has enforced movement and if the movement is of any substantial extent, striker 198 will engage portion 200 of lever 194 so that cable 185, pulling as a consequence on arm 181, will release the latch means so that delivery will immediately cease. If the movement of the truck should continue long enough and gain sufficient impetus, the delivery hose, being connected to the receiving tank, will either break or will break off the unloading valve housing at the weakened line 83' (Figure 21) without disturbing the seating of valve body 93. When this occurs, lever 107' will pull away from rod 163 and tube 118 will pull through so that no further damage will occur as the result of the connected hose.

Also, the latch means for shaft 150 may be released from the front end of the tank by pulling on handle 193.

From the above, it will be seen that I have provided a particularly safe and simple valve control system. The compartment valves and unloading valve are operated in sequence and consequently much less operating force is required than as if they were operated simultaneously. Preferably the unloading valve opens last and closes first, and this sequence is carried out by the cam means above described. There may, of course, be considerable variation in the form and arrangement of parts without departure from the invention, and, accordingly, I do not limit myself in these respects except as in the following claims.

I claim:

1. In combination, a tank equipped with a bottom discharge valve, a top vent valve, a connection between the two valves whereby the discharge valve is opened as a result of the opening of the vent valve, an unloading valve, a conduit connecting said discharge and unloading valves, an operating lever, and connections between said operating lever and the vent and unloading valves whereby swinging of said lever in one direction causes opening of the vent and unloading valves, said connections including a pair of cams and followers, the cams being rotatable by the lever and followers being in connection with said vent valve and unloading valve respectively.

2. In combination, a tank having a discharge valve, a conduit in connection with said discharge valve, a valve controlling said conduit, an operating lever, and connections between said lever and valves including delayed action means whereby swinging of said lever in one direction causes opening first of the tank valve and then of the conduit valve and return movement of the lever causes closing first of the conduit valve and then of the tank valve.

3. Apparatus according to claim 2 wherein said connections include a pair of cams and followers, the cams being rotatable by said lever and the followers being in connection with said discharge valve and conduit valve respectively, the cams having dwells and rises and being mutually related so that one follower is on a dwell of its associated cam while the other follower is on a rise of its associated cam.

4. The combination with a tank having a discharge valve, a conduit in connection with said valve, and a valve controlling said conduit, of operating means for said valves comprising a pair of reciprocable rods in substantial alignment, a shaft extending transversely of said rods between adjacent ends of the latter, a pair of cams fixed on said shaft, followers for said cams secured to said rods respectively, connections between said rods respectively and said valves, and means operable to rotate said shaft, said cams having dwells and rises and being mutually related so that one follower is on a dwell of its associated cam while the other follower is on a rise of its associated cam, the arrangement being such that upon appropriate rotation of said shaft the valves are successively operated.

5. Structure according to claim 4 wherein each follower is slidably guided on the rod to which it is not secured.

6. Structure according to claim 4 wherein spring means are provided for returning said shaft from operated position, wherein means are provided for holding said shaft in operated position, and wherein means are provided for automatically releasing said holding means upon the occurrence of an emergency condition.

7. Structure according to claim 4 wherein spring means are provided for returning said shaft from operated position, and wherein manually releasable means are provided for holding said shaft in operated position.

8. The combination with a tank having compartments and discharge valves in the compartments, of valve selecting and operating means comprising a plurality of plungers arranged with parallel axes on a common circle, means connecting said plungers and said valves respectively, a reciprocable rod at the center of said circle and parallel to the plungers, a radial finger swingable about the axis of said rod and reciprocable with the rod, said plungers having abutment portions selectively engageable by said finger upon swinging adjustment of the latter, and means operable to move said rod lengthwise whereby to displace through said finger a selected plunger and thereby operate the valve which is connected to the latter.

9. Structure according to claim 8 wherein a hand wheel is fixed to said finger and has indicia cooperating with an externally fixed marker to indicate the selected valve.

10. Structure according to claim 8 wherein a common return member for the plungers is reciprocable with said rod.

11. Structure according to claim 8 wherein a common return member for the plungers is reciprocable with said rod, and wherein said return member is constituted by a hand wheel fixed to said finger and having indicia cooperating with an externally fixed marker to indicate the selected valve.

12. In a tank truck comprising a chassis and a tank mounted thereon, and a tank valve control lever having a return spring, the combination of a latch for holding said lever in operated position, a striker having enforced movement when the truck moves, a member having a portion adapted to be struck and displaced by said striker, means yieldingly holding said portion normally out of the range of said striker, and a connection between said latch and said member whereby said portion is moved into the range of said striker when said latch is in holding relation to said lever, said connection acting to release said latch upon displacement of said portion by said striker.

13. In a tank truck comprising a chassis and a tank mounted thereon, and a tank valve control lever having a return spring, the combination of a latch for holding said lever in operated position, a striker having enforced movement when the truck moves, a member having a portion adapted to be struck and displaced by said striker, means yieldingly holding said portion normally out of the range of said striker, and a connection between said latch and said member whereby said portion is moved into the range of said striker when said latch is in holding relation to said lever, said connection acting to release said latch upon displacement of said portion by said striker, said latch including portions united by a fusible joint so that the latch will be disabled and will release said lever in case of fire in the vicinity of said joint.

14. In a tank truck comprising a chassis and a tank mounted thereon, a tank valve control lever having a return spring, a compartment in which said lever is mounted, and a pivoted door for said compartment, the combination of a latch for holding said lever in operated position, a striker having enforced movement when the truck moves, a member having a portion adapted to be struck and displaced by said striker, means holding said portion out of the range of said striker when said door is closed but releasing said portion when the door is open, and a connection between said latch and said member whereby said portion is moved into the range of said striker when said door is open and said latch is in holding relation to said lever, said connection acting to release said latch upon displacement of said portion by said striker.

15. In a tank truck comprising a chassis and a tank mounted thereon, a tank valve control lever having a return spring, a compartment in which said lever is mounted, and a pivoted door for said compartment, the combination of a latch for holding said lever in operated position, a striker having enforced movement when the truck moves, a member having a portion adapted to be struck and displaced by said striker, means holding said portion out of the range of said striker when said door is closed but releasing said portion when the door is open, a connection between said latch and said member whereby said portion is moved into the range of said striker when said door is open and said latch is in holding relation to said lever, said connection acting to release said latch upon displacement of said portion by said striker, and a connection between said door and said latch whereby closing of the door releases said latch.

16. The combination with a tank having an unloading valve including a casing having a discharge end adapted to have a hose connected thereto, a seat spaced inwardly from said end, a movable closure element normally engaging said seat, a rock shaft journaled in said housing outwardly of said seat, and a lever on said shaft in connection with said closure element whereby to open the latter upon appropriate rocking of said shaft, of a vent conduit in connection with said casing outwardly of said seat, a self-closing valve for said conduit, and a lug on said lever arranged to cause the conduit valve to open as said lever moves during the closing movement of said closure element.

17. The combination with a tank having compartments and discharge valves in the compartments, of valve selecting and operating means comprising a plurality of movable members arranged about a point, means connecting said members and said valves respectively, a rotary and bodily displaceable operating member at said point, said movable members having abutment portions selectively engageable by said operating member upon rotary adjustment of the latter, and means operable to displace said operating member to move a selected movable member and thereby operate the valve which is connected to the latter.

18. The combination with a tank having compartments and discharge valves in said compartments, of independent valve operating connections extending from said valves to a common station, selector means at said station selectively engageable with said connections, and means for displacing said selector means whereby to operate the connection with which said selector means is engaged and therewith the associated valve.

19. The combination with a tank having compartments and discharge valves in said compartments, of valve selecting and operating means comprising cables extending from said valves to a common station, abutments in connection with said cables at said station, selector means at said station selectively engageable with said abutments, and means for displacing said selector means whereby to tension the cable which is in connection with the abutment engaged by said selector means.

FRANK A. HOLBY.